US009215031B2

(12) United States Patent
Campbell et al.

(10) Patent No.: US 9,215,031 B2
(45) Date of Patent: Dec. 15, 2015

(54) DETERMINING LEAST-LATENCY PATHS ACROSS A PROVIDER NETWORK UTILIZING AVAILABLE CAPACITY

(71) Applicant: Verizon Patent and Licensing, Inc., Basking Ridge, NJ (US)

(72) Inventors: Gary L. Campbell, Allen, TX (US); Oommen Mathews, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 421 days.

(21) Appl. No.: 13/624,271

(22) Filed: Sep. 21, 2012

(65) Prior Publication Data

US 2014/0086576 A1 Mar. 27, 2014

(51) Int. Cl.
*H04B 17/00* (2015.01)
*H04J 14/02* (2006.01)

(52) U.S. Cl.
CPC ......... *H04J 14/0269* (2013.01); *H04J 14/0227* (2013.01); *H04J 14/0267* (2013.01); *H04J 14/021* (2013.01)

(58) Field of Classification Search
CPC ..... H04W 24/08; H04W 24/02; H04W 24/10; H04W 24/06; H04L 43/50; H04B 10/25133; H04B 10/25137; H04B 10/2507; H04B 10/2569; H04B 10/2513
USPC ......... 370/252, 427, 230.1, 503; 398/29, 159, 398/45
See application file for complete search history.

(56) References Cited

U.S. PATENT DOCUMENTS

| 6,417,943 | B1 * | 7/2002 | Saraswat et al. ................. 398/75 |
|---|---|---|---|
| 2005/0198280 | A1 * | 9/2005 | Hall et al. ...................... 709/224 |
| 2008/0123680 | A1 * | 5/2008 | Ko et al. ........................ 370/433 |
| 2009/0010157 | A1 * | 1/2009 | Holmes et al. ............. 370/230.1 |
| 2010/0309932 | A1 * | 12/2010 | Diab et al. ..................... 370/503 |
| 2010/0329695 | A1 * | 12/2010 | Sridhar ......................... 398/159 |
| 2011/0206371 | A1 * | 8/2011 | Tajima et al. ................... 398/29 |
| 2011/0228702 | A1 * | 9/2011 | Knepley et al. ............... 370/254 |
| 2011/0318004 | A1 * | 12/2011 | Bruno ............................. 398/45 |
| 2012/0076014 | A1 * | 3/2012 | Bragg ........................... 370/252 |
| 2012/0087377 | A1 * | 4/2012 | Lai ................................ 370/427 |
| 2012/0182865 | A1 * | 7/2012 | Andersen et al. ............. 370/228 |
| 2012/0328296 | A1 * | 12/2012 | Sullivan et al. ................. 398/79 |

* cited by examiner

*Primary Examiner* — Andrew Chriss
*Assistant Examiner* — Atique Ahmed

(57) ABSTRACT

A computer device may include logic configured to receive a selection of a start node and an end node in an optical network and obtain network topology information relating to the optical network. The logic may be further configured to determine link latencies for particular links in the optical network; determine a least latency path between the start node and the end node based on the obtained network topology information and the determined link latencies, and wherein the least latency path includes one or more of the particular links; determine one or more alternate paths to the determined least latency path; determine channel availability for the least latency path and the one or more alternate paths; and generate a user interface that relates the least latency path and the one or more alternate paths to the determined channel availability.

20 Claims, 11 Drawing Sheets

710

| A Loc | Z Loc | Channels | FiberType | Distance(KM) | ALoc DCM | ZLoc DCM |
|---|---|---|---|---|---|---|
| Node 5 | Node 8 | 44 | SMF-28 | 2.63 | SMF-10Km | SMF-10Km |
| Node 4 | Node 1 | 44 | SMF-28 | 8.8 | SMF-10Km | SMF-10Km |
| Node 4 | Node 1 | 44 | SMF-28 | 8.75 | SMF-10Km | SMF-10Km |
| Node 3 | Node 6 | 44 | SMF-28 | 5.36 | SMF-10Km | SMF-10Km |
| Node 3 | Node 6 | 44 | SMF-28 | 4.99 | SMF-10Km | SMF-10Km |
| Node 6 | Node 5 | 44 | SMF-28 | 3.85 | | |
| Node 1 | Node 2 | 44 | SMF-28 | 32 | SMF-30Km | SMF-30Km |
| Node 1 | Node 2 | 44 | SMF-28 | 31.59 | SMF-30Km | SMF-30Km |
| Node 8 | Node 7 | 44 | SMF-28 | 1.5 | | |

| DCM TYPE | LATENCY |
|---|---|
| SMF-10 | 6.75 |
| SMF-20 | 13 |
| SMF-70 | 47.25 |
| SMF-80 | 54 |
| SMF-90 | 60.75 |
| SMF-100 | 67.5 |
| SMF-110 | 74.25 |
| SMF-111 | 81 |
| SMF-112 | 14.71 |
| SMF-113 | 29.42 |
| SMF-114 | 44.13 |
| SMF-115 | 58.84 |
| SMF-116 | 73.55 |

| FIBER TYPE | LATENCY per KM |
|---|---|
| SMF-28 | 4.8974 |
| TERALIGHT | 4.8977 |
| TRUEWAVEREACH | 4.9034 |
| TRUEWAVERS | 4.9067 |
| TRUEWAVEXL | 4.9141 |
| LEAF | 4.8967 |
| G.654 | 4.9034 |
| DSF | 4.9034 |
| LS | 4.9034 |

770 — Node_12 to Node_11

| SEQ# | # of AVAIL CHANNELS | CH 1 | CH 2 | CH 3 | CH 4 | CH 5 | CH 6 | CH 7 | CH 8 | CH 9 | CH 10 | CH 11 | CH 12 | CH 13 | CH 14 | CH 15 | CH 16 | CH 17 | CH 18 | CH 19 | CH 20 | CH 21 | CH 22 | CH 23 | CH 24 | CH 25 | CH 26 | CH 27 | CH 28 |
|---|---|---|---|---|---|---|---|---|---|---|---|---|---|---|---|---|---|---|---|---|---|---|---|---|---|---|---|---|---|
| 1 | 28 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 2 | 25 | 27 | | | | | | | | | | | | | | | | | | | | | | | | | | | |
| 3 | 2 | | | | | | | | | | | | | | | | | | | | | | | | | | | | |

Node_9 to Node_11

| SEQ# | # of AVAIL CHANNELS | CH 1 | CH 2 | CH 3 | CH 4 | CH 5 | CH 6 | CH 7 | CH 8 | CH 9 | CH 10 | CH 11 | CH 12 | CH 13 | CH 14 | CH 15 | CH 16 | CH 17 | CH 18 | CH 19 | CH 20 | CH 21 | CH 22 | CH 23 | CH 24 | CH 25 | CH 26 | CH 27 | CH 28 |
|---|---|---|---|---|---|---|---|---|---|---|---|---|---|---|---|---|---|---|---|---|---|---|---|---|---|---|---|---|---|
| 1 | 0 | | | | | | | | | | | | | | | | | | | | | | | | | | | | |
| 2 | 0 | | | | | | | | | | | | | | | | | | | | | | | | | | | | |
| 3 | 0 | | | | | | | | | | | | | | | | | | | | | | | | | | | | |

DETERMINING LEAST-LATENCY PATHS ACROSS A PROVIDER NETWORK UTILIZING AVAILABLE CAPACITY

BACKGROUND INFORMATION

A provider's optical network may include a large number of network nodes interconnected via optical links. The provider may need to select an optical path through the optical network from a first location to a second location. Multiple paths may be available from the first location to the second location and the provider may need to be able to select one or more of the optical paths based on a particular criterion. A criterion that may be used to select an optical path may be latency. Path latency may refer to a length of time that it takes an optical signal to travel from one end of an optical path to the other end. Selecting one or more optical paths based on path latency may enable the provider to offer a customer the best available path from a first location to a second location.

BRIEF DESCRIPTION OF THE DRAWINGS

FIGS. 7A-7H are example tables and user interfaces that may be generated according to an implementation described herein.

DETAILED DESCRIPTION OF PREFERRED EMBODIMENTS

Figure 1:
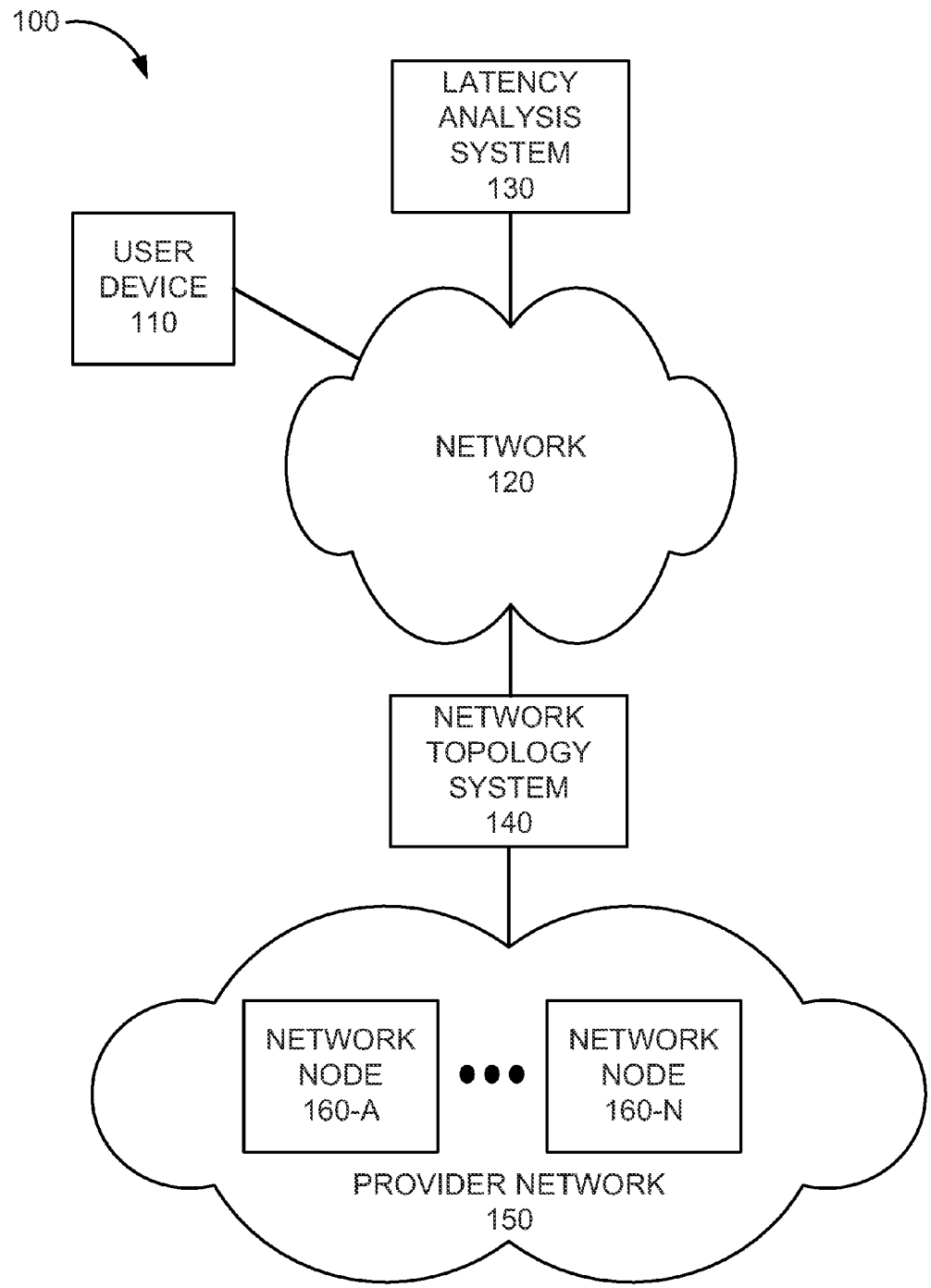
FIG. 1 is a diagram illustrating an exemplary environment according to an implementation described herein.

The following detailed description refers to the accompanying drawings. The same reference numbers in different drawings identify the same or similar elements.

An implementation described herein relates to determining a least-latency path and one or more alternate paths between a start node and an end node in an optical network, determining channel availability for the least-latency path and the one or more alternate paths, and generating a user interface that provides an indication of the least-latency path and the one or more alternate paths along with an indication of the determined channel availability.

Path latency may refer to an estimated round trip delay for an optical signal from a start node to an end node. The path latency for a path may be based on the link latencies associated with optical links that make up the path. The latency of a link from a first network node to a second network node may be based on a fiber latency associated with the link, based on a dispersion compensating module (DCM) latency associated with the link, and/or based on a re-configurable optical add-drop multiplexer (ROADM) latency associated with the link. For example, link latency may be calculated based on the following equation:

$$\text{LINK LATENCY} = (\text{link length} * \text{fiber type latency per km}) + (\text{DCM type latency}) + (\text{ROADM type latency}) \qquad (1)$$

In Equation (1), link length may refer to the length of the link in kilometers (km), fiber type latency per km may refer to the latency per km for the type of fiber associated with the link, DCM type latency may refer to the latency for the type of DCM associated with the link, and ROADM type latency may refer to the latency for the type of ROADM associated with the link. A DCM may include a device that may be inserted into an optical fiber link to compensate for signal dispersion by re-transmitting a signal. A DCM may allow transmission link distances to be increased past a transceiver dispersion limit. However, a DCM may increase the latency of the signal and different types of DCMs may be associated with different latency values. A ROADM may include a device that can add, block, pass, or redirect modulated light beams of various wavelengths in an optical network. For example, a ROADM may multiplex 44 different wavelengths per fiber, 88 different wavelengths per fiber, or a different number of wavelengths per fiber. A ROADM may increase the latency of a signal and different types of ROADMs may be associated with different latency values.

Once link latencies for a link in a path are determined, the path latency may be determined. For example, path latency may be calculated based on the following equation:

$$\text{PATH LATENCY} = 2*(\text{sum of link latencies} + (2*\text{interface card latency}) + \text{ROADM latency}) \qquad (2)$$

In Equation (2), the sum of link latencies may refer to the sum of the individual link latencies of all the links that make up the path, the interface card latency may refer to a latency associated with an interface card at a first end of the path and an interface card at a second end of the path, and ROADM latency may refer to a latency associated with a ROADM associated with the path. The computed path latency may correspond to a round-trip-delay associated with the path.

A least latency path from a start node to an end node may be identified based on a topology of an optical network and based on link latencies of individual links in the network. For example, link latencies for the links in the network may be determined using Equation (1) and using latency values for fiber types, DCM types, and ROADM types included in the optical networks. Once link latencies for the individual links are determined, a least latency path may be determined using a Dijkstra algorithm to find a least cost path from the start node to the end node, using the link latencies as the cost associated with the links. Once the least latency path is identified, alternate paths may be identified by, for example, dropping links from the least latency path and identifying alternate links to dropped links.

Once a least latency path and one or more alternate paths have been identified, channel availability information may be obtained. The channel availability information may indicate which channels are available on each link of the least latency path and the one or more alternate paths. A determination may be made whether a contiguous available channel exists for the least latency path and the one or more alternate paths. A contiguous channel may exist if the same channel number is available on each link of a path. A contiguous channel may be preferable because no channel switching needs to be performed. Switching from a first channel to a second channel may require use of additional equipment, may introduce additional latency into a path, and may correspond to an inefficient allocation of resources.

However, in some situations, a contiguous channel may not be available. If a contiguous channel is not available for an identified path, a combination of channels may be identified that result in the minimum number of channel switches for the path. For example, a first channel and a second channel may be identified for the path such that making a switch from the first channel to the second channel at an intermediate node of the path generates a light path from a start node to an end node of the path.

A user interface may be generated that includes an identified least latency path and one or more alternate paths, along with an indication of channel availability for the identified least latency path and the one or more alternate paths. A technician may use the generated user interface to select a potential path for a customer requesting an optical circuit from a first location to a second location and may be able to provide an estimated latency for the selected path to the customer.

FIG. 1 is a diagram illustrating an exemplary environment 100 according to an implementation described herein. As shown in FIG. 1, environment 100 may include a user device 110, a network 120, a latency analysis system 130, a network topology system 140, and a provider network 150.

User device 110 may include any device capable of communicating with a server device using, for example, a browser application (e.g., Internet Explorer, Mozilla Firefox, Google Chrome, Apple Safari, Opera, etc.). User device 110 may access latency analysis system 130 to determine one or more available paths from a start node to an end node based on latency. User device 110 may include a desktop computer; a laptop computer; a tablet computer; a mobile communication device, such as a mobile phone, a smart phone, a tablet computer, a laptop, a personal digital assistant (PDA), or another type of portable communication device; and/or another type of computation and/or communication device.

Network 120 may enable user device 110, latency analysis system 130, and/or network topology system 140 to communicate with each other. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Latency analysis system 130 may include one or more devices, such as server devices, which identifies a least latency path and one or more alternate paths between a start node and an end node and that determines channel availability for the identified least latency path and one or more alternate paths. The least latency path and the one or more alternate paths may be identified by determining path latencies for paths between the start node and the end node based on link latencies associated with links in provider network 150 and based on network topology information associated with provider network 150. The network topology information may be obtained from network topology system 140.

Network topology system 140 may include one or more devices, such as server devices, which maintain information about the network topology of provider network 150. For example, network topology system 140 may maintain an inventory of network nodes in provider network 150, an inventory of links between the network nodes (e.g., which node is connected to which node), and/or may maintain information about the nodes and links (e.g., a fiber type associated with a link, a DCM type associated with a link, a ROADM type associated with a node, etc.).

Provider network 150 may include a provider's optical network that includes network nodes 160-A to 160-N (referred to herein collectively as "network nodes 160" and individually as "network node 160") interconnected via optical links. In one implementation, some or all of provider network 150 may be part of network 120. In another implementation, some or all of provider network 150 may be separate from network 120. Network node 160 may include one or more devices that interconnect optical links and/or manage a light path to be switched from one optical channel to another optical channel. For example, network element 170 may include a re-configurable optical add-drop multiplexer (ROADM), a Synchronous Optical Networking (SONET) multiplexer, a digital cross-connect device, a wavelength selectable switch (WSS), and/or another type of optical device.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
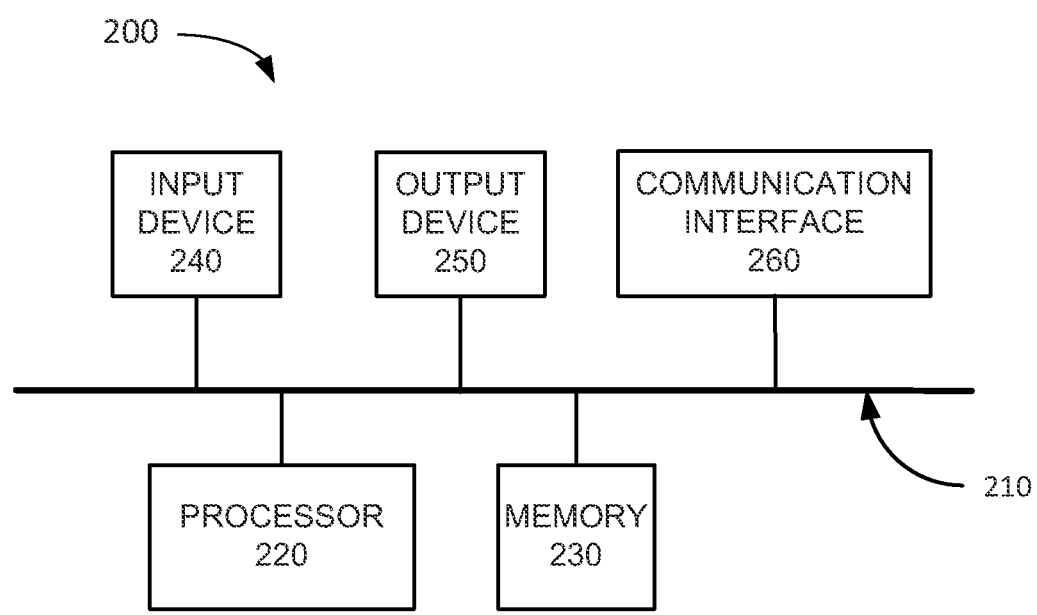
FIG. 2 is a diagram illustrating an exemplary device that may be included in a component of the environment of FIG. 1 according to an implementation described herein.

FIG. 2 is a diagram illustrating an exemplary device 200 that may be included in a component of the environment of FIG. 1 according to an implementation described herein. User device 110, latency analysis system 130, network topology system 140, and/or other devices in environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFD)) interface, a near-field communications (NFC) wireless interface, and/or any other type of interface that converts data from one form to another form.

As will be described in detail below, device 200 may perform certain operations relating to determining one or more available optical paths from a start node to an end node based on path latency. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2.

Additionally or alternatively, one or more components of device 200 may perform one or more tasks described as being performed by one or more other components of device 200.

Figure 3:
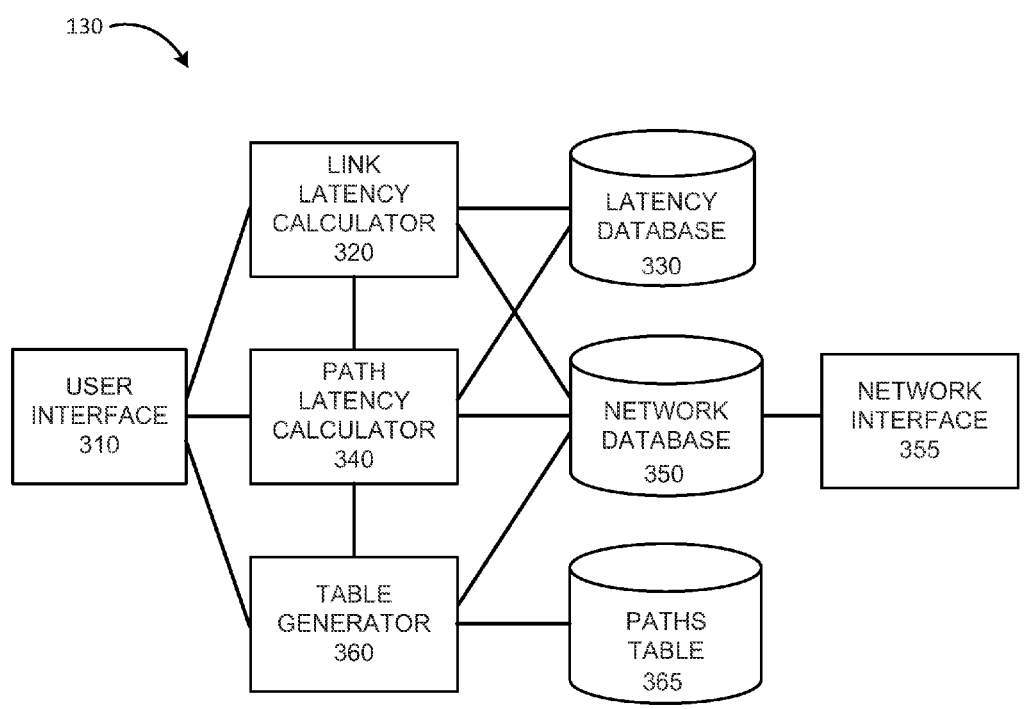
FIG. 3 is a diagram illustrating exemplary functional components of the user device of FIG. 1 according to an implementation described herein.

FIG. 3 is a diagram illustrating exemplary functional components of latency analysis system 130 according to an implementation described herein. The functional components of latency analysis system 130 may be implemented, for example, via processor 220 executing instructions from memory 230. Alternatively, some or all of the functional components of latency analysis system 130 may be implemented via hard-wired circuitry. As shown in FIG. 3, latency analysis system 130 may include a user interface 310, a link latency calculator 320, a latency database 330, a path latency calculator 340, a network database 350, a network interface 355, a table generator 360, and a paths table 365.

User interface 310 may enable communication between user device 110 and latency analysis system 130. For example, user interface 310 may receive a request, from user device 110, for a least latency path and alternate paths from a start node and an end node. As another example, user interface 310 may provide a generated table of paths and available channels to user device 110.

Link latency calculator 320 may calculate link latencies for links in provider network 150 based on information stored in latency database 330 and based on information stored in network database 350. For example, link latency calculator 320 may use Equation (1) to determine the latency for a link in provider network 150. Latency database 330 may store information used to calculate link latencies. Exemplary information that may be stored in latency database 330 is described below with reference to FIG. 4A.

Path latency calculator 340 may determine a least latency path from a start node to an end node based on link latencies of individual links of provider network 150. For example, path latency calculator 340 may use a Dijkstra algorithm to find a least cost path from a start node to an end node, using the link latencies associated with links between network nodes 160 as the cost and using information stored in network database 350. Furthermore, path latency calculator 340 may find one or more alternate paths to the least latency path by dropping individual links from the least latency cost path and identifying alternate links to replace the dropped links, by dropping all links from the least latency path and finding alternate links to replace all the dropped links. Additional alternate paths may be identified by dropping individual links, or all links, from any identified alternate paths and identifying links to replace the dropped links.

Network database 350 may store information relating to links in provider network 150. Exemplary information that may be stored in network database 350 is described below with reference to FIG. 4B. Network interface 355 may communicate with network topology system 140. For example, network interface 355 may obtain network topology information from network topology system 140 and store the obtained information in network database 350. Network interface 355 may receive updates relating to the network topology information from network topology system 140 and may update the information in network database 350 based on the updates.

Table generator 360 may generate a table that includes a least latency path and one or more alternate paths between a specified start node and end node. Table generator 360 may further determine channel availability for the paths included in the table and may provide an indication of the channel availability for the paths in the table. Furthermore, table generator 360 may determine whether a contiguous available channel exists for each of the paths and may generate an indication of whether a contiguous channel exists. If a contiguous channel does not exist for a path, table generator 360 may identify a first channel and a second channel that may be used to create an optical link through the path.

Paths table 365 may store a table of paths generated by table generator 360. One or more tables stored in paths table 365 may be provided to user device 110 by table generator 360 via user interface 310.

Although FIG. 3 shows exemplary functional components of latency analysis system 130, in other implementations, latency analysis system 130 may include fewer functional components, different functional components, differently arranged functional components, or additional functional components than depicted in FIG. 3. Additionally or alternatively, one or more functional components of latency analysis system 130 may perform functions described as being performed by one or more other functional components of latency analysis system 130.

Figure 4A:
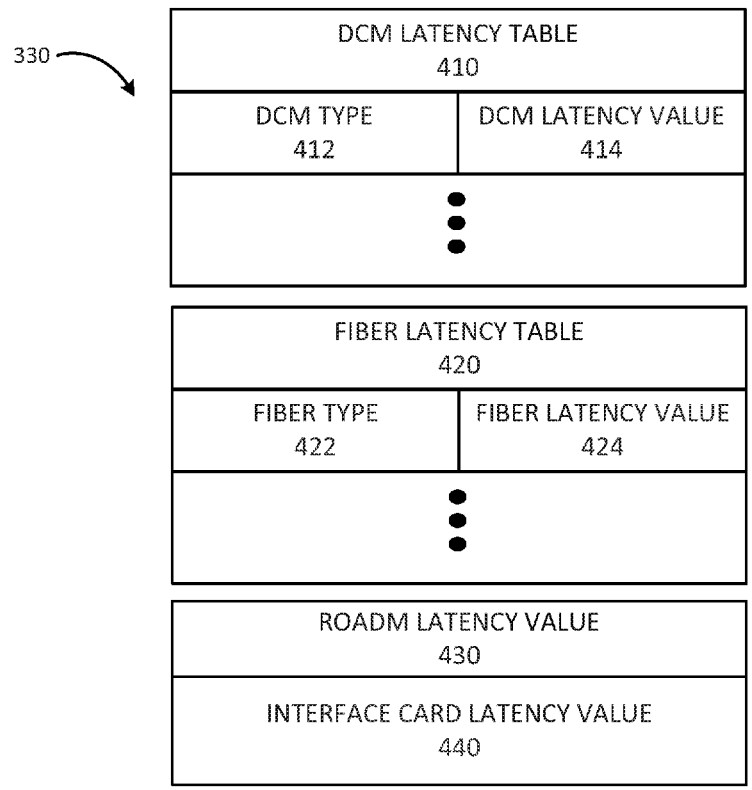
FIG. 4A is a diagram illustrating exemplary components of the latency database of FIG. 3 according to an implementation described herein.

FIG. 4A is a diagram illustrating exemplary components of latency database 330 according to an implementation described herein. As shown in FIG. 4A, latency database 330 may include a DCM latency table 410, a fiber latency table 420, a ROADM latency value field 430, and an interface card latency value field 440.

DCM latency table 410 may store information that relates a particular DCM type to a particular latency value. For example, for each DCM type in provider network 150, DCM latency table 410 may include a DCM type field 412 and a corresponding DCM latency value field 414. DCM type field 412 may store information identifying a particular DCM type. DCM latency value field 414 may store a DCM latency value associated with the particular DCM type.

Fiber latency table 420 may store information that relates a particular fiber type to a particular latency value. For example, for each fiber type in provider network 150, fiber latency table 420 may include a fiber type field 422 and a corresponding fiber latency value field 424. Fiber type field 422 may store information identifying a particular fiber type. Fiber latency value field 424 may store a fiber latency value associated with the particular fiber type.

ROADM latency value field 430 may store a ROADM latency value associated with ROADMs used in provider network 150. In some implementations, a ROADM value may be provided as input by a user when specifying a start node and an end node. In other implementations, a ROADM value may be stored in ROADM latency value field 430 beforehand. In yet other implementations, provider network 150 may include multiple types of ROADMs and each type of ROADM may be associated with a particular ROADM latency value. Thus, ROADM latency value field 430 may store a table relating ROADM types to ROADM latency values.

Interface card latency value field 440 may store an interface card latency value associated with an interface card that may be used at the beginning and/or end of an optical circuit. For example, an interface card may include a tunable 10 Gigabit transponder module (TGTM) and the interface card latency value may correspond to a TGTM latency value. In some implementations, an interface card value may be provided as input by a user when specifying a start node and an end node. In other implementations, an interface card value may be stored in interface card latency value field 440 beforehand. In yet other implementations, provider network 150 may include multiple types of interface cards and each type of interface card may be associated with a particular interface card latency value. Thus, interface card latency value field 440 may store a table relating interface card types to interface card latency values.

Although FIG. 4A shows exemplary components of latency database 330, in other implementations, latency database 330 may include fewer components, different components, differently arranged components, or additional components than depicted in FIG. 4A.

Figure 4B:
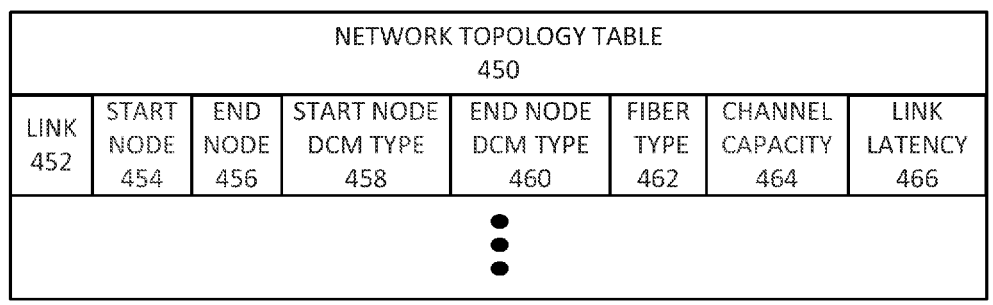
FIG. 4B is a diagram illustrating exemplary components of the network database of FIG. 3 according to an implementation described herein.

FIG. 4B is a diagram illustrating exemplary components of network database 350 according to an implementation described herein. As shown in FIG. 4B, network database 350 may include a network topology table 450. Network topology table 450 may store information about particular links in provider network 150. For example, for each link in the network, network topology table 450 may include a link field 452, a start node field 454, an end node field 456, a start node DCM type field 458, an end node DCM type field 460, a fiber type field 462, a channel capacity field 464, and a link latency field 466.

Link field 452 may store information identifying a particular link. Start node field 454 may store information identifying the start node associated with the particular link. End node field 456 may store information identifying the end node associated with the particular link. If the link connecting the start node and the end node corresponds to a two-way fiber connection, the start node and the end node may be interchangeable and may be referred to as a first node and a second node.

Start node DCM type field 458 may store information identifying a DCM type associated with the start node of the particular link. End node DCM type field 460 may store information identifying a DCM type associated with the end node of the particular link. Fiber type field 462 may store information identifying a particular fiber type associated with the link. Furthermore, fiber type field 462 may include stored information relating to the length of the link (e.g., the length in km).

Channel capacity field 464 may store information relating to the channel capacity associated with the particular link. For example, channel capacity field 464 may indicate which channels (e.g., of an available 44 channels, 88 channels, or a different number of channels) are in use and which channels are available. Link latency field 466 may store a link latency associated with the particular link as computed by link latency calculator 320.

Although FIG. 4B shows exemplary components of network database 350, in other implementations, network database 350 may include fewer components, different components, differently arranged components, or additional components than depicted in FIG. 4B. For example, if different types of ROADMs are in use in provider network 150, network topology table 450 may store information identifying a type of ROADM associated with the start node and/or a type of ROADM associated with the end node.

Figure 5:
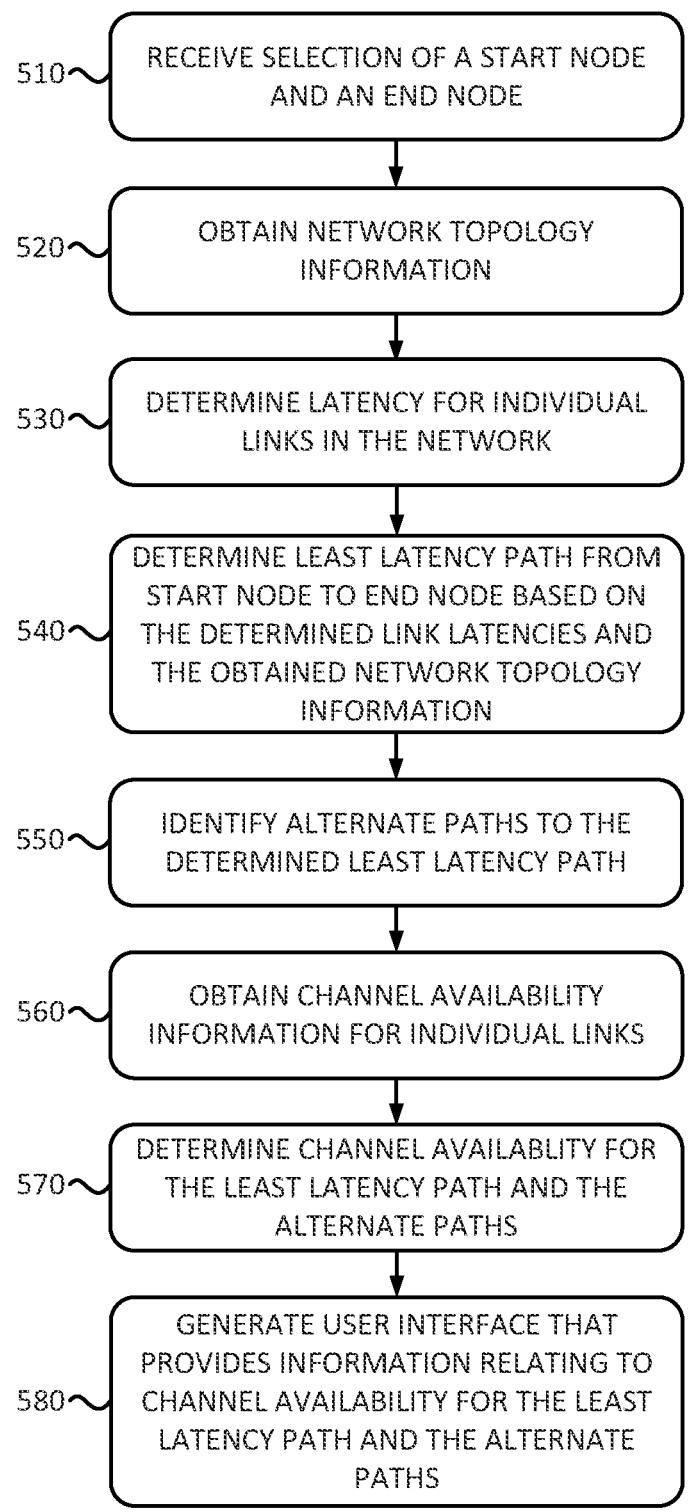
FIG. 5 is a flow chart of an exemplary process for determining available paths from a start node to an end node based on latency according to an implementation described herein.

FIG. 5 is a flow chart of an exemplary process for determining available paths from a start node to an end node based on latency according to an implementation described herein. In one implementation, the process of FIG. 5 may be performed by latency analysis system 130. In other implementations, some or all of the process of FIG. 5 may be performed by another device or a group of devices separate from latency analysis system 130 and/or including latency analysis system 130.

The process of FIG. 5 may include receiving a selection of a start node and an end node (block 510). For example, a technician may use user device 110 to request a least latency path and one or more alternate paths from a start node and an end node. In some implementations, the request may include additional information, such as particular latency values to be used in determining the least latency path and the one or more alternate paths (a ROADM latency value, an interface latency value, etc.).

Network topology information may be obtained (block 520). For example, network interface 355 may obtain network topology information from network topology system 140 and may store the obtained information in network topology table 450. Latency for individual links in the network may be determined (block 530). For example, link latency calculator 320 may identify DCM types associated with a link and may identify a fiber type and a link length associated with the link by accessing the entry associated with the link in network topology table 450. Link latency calculator 320 may access DCM latency table 410 and fiber latency table 420 to obtain one or more DCM latency values for the link and to obtain a fiber latency value for the link. Link latency calculator 320 may further obtain a ROADM latency value for the link (e.g., by accessing ROADM latency value field 430). Link latency calculator 320 may then use Equation (1) to calculate a link latency for the link.

A least latency path may be determined from the start node to the end node based on the determined link latencies and based on the obtained network topology information (block 540). Path latency calculator 340 may use a Dijkstra algorithm to determine a least latency path from the start node to the end node, using the determined link latencies as the cost associated with each link. For example, path latency calculator 340 may begin by assuming that the path latency from the start node to any other node in the network is infinity. Path latency calculator 340 may then examine all links out of the start node using the calculated link latencies and may select the link with the lowest latency to one of the nodes (e.g., node A) reachable from the start node. Path latency calculator 340 takes the link from the start node to node A (referred to hereafter as link SN-A) as the least latency path from the start node to node A.

Starting with node A, path latency calculator 340 may examine all links from node A to adjacent nodes (nodes $B_1$-$B_N$) and may compute the total path latency from the start node to the nodes adjacent to node A as the link latency of link SN-A plus the link latency of the link from node A to $B_x$, where X is a value from 1 to N. This path will be referred to as path SN-A-$B_x$. If any of the path latency values from the start node to $B_x$ has a non-infinite value, then $B_x$ links directly to the start node (referred to hereafter as link SN-$B_x$). If the path latency of SN-A-$B_x$ is less than the path latency of SN-$B_x$, the path SN-A-$B_x$ is a better way to reach $B_x$ than the path SN-$B_x$. Otherwise, Sn-$B_x$ is retained as the best path to $B_x$. Once this process is performed for all the nodes $B_1$ to $B_N$, the path with the least latency value is selected and the process is repeated.

For example, assume the least latency path so far is the path SN-A-B. Path latency calculator 340 may examine all links from node B to adjacent nodes (nodes $C_1$-$C_N$) and may compute the total path latency from the start node to the nodes adjacent to node B as the link latency of link SN-A-B plus the link latency of the link from node B to $C_x$, where X is a value from 1 to N. This process may be continued until the end node is reached, and the path obtained by the process to reach the end node may correspond to the least latency path from the start node to the end node.

Alternate paths may be identified to the least latency path (block 550). Path latency calculator 340 may identify one or more alternate paths to the least latency path using the process described below with reference to FIG. 6. Channel availability information may be obtained for individual links (block 560) and channel availability may be determined for the least latency path and the alternate paths (block 570). For example, network interface 355 may obtain channel availability information from network topology system 140 and may store the obtained information in network topology table 450 (e.g., in channel capacity field 464 associated with a particular link).

A user interface may be generated that provides information relating to channel availability for the least latency path and the alternate paths (block 580). For example, table generator 360 may generate a paths table that includes the least latency path and one or more alternate paths. Each of the paths listed in the table may include a list of the nodes that make up the path from the start node to the end node. Furthermore, for each of the links that make up one of the paths, channel availability information may be included. For example, table generator 360 may indicate which channel are available for each link and/or may include an indication as to how many available channels are associated with each link.

Table generator 360 may determine whether a contiguous available channel exists for each of the paths in the generated table, based on the channel available information associated with each of the paths. For example, if a path includes links A-B-C-D-E and channel number X is available on each of the links A-B, B-C, C-D, and D-E, channel number X may correspond to a contiguous channel for the path. If a contiguous channel is available for a path, table generator 360 may include an indication of the contiguous channel. For example, table generator 360 may indicate the number of contiguous channels for the path and may list the channel numbers corresponding to the contiguous channels.

If a path does not include a contiguous channel, table generator 360 may identify a first channel and a second channel that may together enable an optical path to be created for the path. For example, if a path includes the links A-B-C-D-E and a first channel $X_1$ is available on the links A-B and B-C, and a second channel $X_2$ is available on the links C-D and D-E, switching from channel $X_1$ to channel $X_2$ at node C may enable an optical path to be created from A to E.

If a contiguous channel is not available for a path, table generator 360 may include an indication of a first channel and a second channel that may be used together to create a continuous optical path. For example, table generator 360 may include a graphic indicator that shows the path that may be created using the first channel and the second channel, as described below with reference to the example of FIG. 7H.

Figure 6:
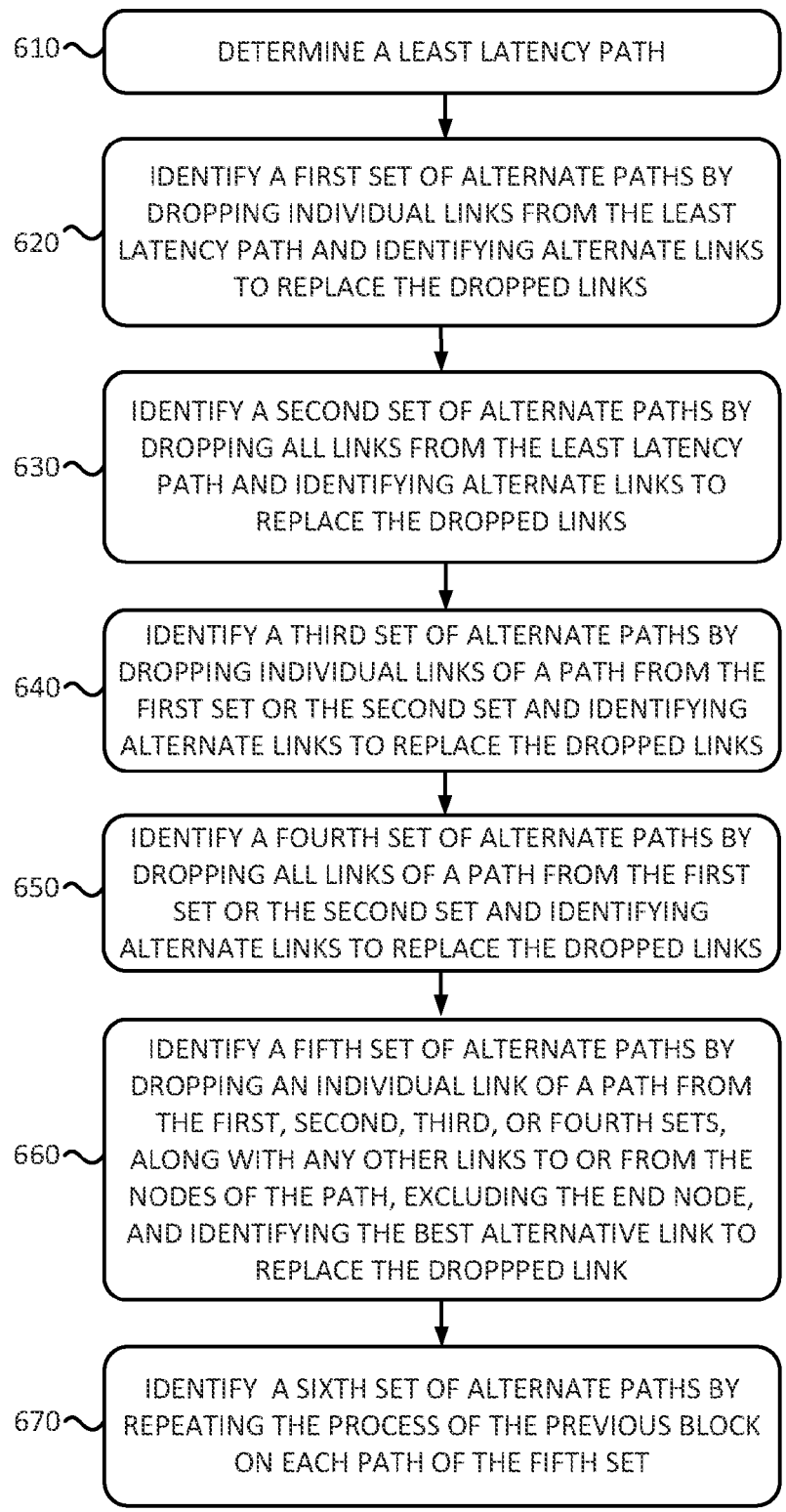
FIG. 6 is a flow chart of an exemplary process for determining alternate paths to a least latency path according to an implementation described herein.

FIG. 6 is a flow chart of an exemplary process for determining alternate paths to a least latency path according to an implementation described herein. In one implementation, the process of FIG. 6 may be performed by latency analysis system 130. In other implementations, some or all of the process of FIG. 6 may be performed by another device or a group of devices separate from latency analysis system 130 and/or including latency analysis system 130.

The process of FIG. 6 may include determining a least latency path (block 610). For example, a least latency path may be determined as described above with reference to block 540 of FIG. 5. A first set of alternate paths may be identified by dropping individual links from the least latency path and finding alternate links to replace the dropped links (block 620). For example, if the least latency path includes the links A-B-C-D-E, path latency calculator 340 may first drop the link A-B and may identify the best replacement link to link A-B (e.g., link A-F), then may drop the link B-C and may identify the best replacement link to B-C, then may drop the link C-D and may identify the best replacement link to link C-D, and then may drop the link D-E and may identify the best replacement link to link D-E.

A second set of alternate paths may be identified by dropping all links from the least latency path and identifying alternate links to replace the dropped links (block 630). For example, if the least latency path includes the links A-B-C-D-E, path latency calculator 340 may drop all of the links A-B, B-C, C-D, and D-E, and may identify an alternate least latency path that does not use any of these links.

A third set of alternate paths may be identified by dropping individual links of a path from the first set or the second set and identifying alternate links to replace the dropped links (block 640). For example, assume the first set of alternate paths includes the path A-F-C-D-E, where link A-F replaced link A-B and link F-C replaced link B-C. Path latency calculator 340 may first drop the link A-F and may identify the best replacement link, or a set of replacement links, to link A-F, then may drop the link F-C and may identify the best replacement link, or a set of replacement links, to link F-C, then may drop the link C-D and may identify the best replacement link, or a set of replacement links, to link C-D, and then may drop the link D-E and may identify the best replacement link, or a set of replacement links, to link D-E.

Similarly, assume that the second set of paths includes the path A-F-G-H-E. Path latency calculator 340 may first drop the link A-F and may identify the best replacement link, or a set of replacement links, to link A-F, then may drop the link F-G and may identify the best replacement link, or a set of replacement links, to link F-G, then may drop the link G-H and may identify the best replacement link, or a set of replacement links, to link G-H, and then may drop the link H-E and may identify the best replacement link, or a set of replacement links, to link H-E.

A fourth set of alternate paths may be identified by dropping all links from a path from the first set or the second set and identifying alternate links to replace the dropped links (block 650). For example, assume the first set of alternate paths includes the path A-F-C-D-E, where link A-F replaced link A-B and link F-C replaced link B-C. Path latency calculator 340 may drop all of the links A-F, F-C, C-D, and D-E, and may identify an alternate least latency path that does not use any of these links. Similarly, assume the second set of paths includes the path A-F-G-H-E. Path latency calculator 340 may drop all of the links A-F, F-G, G-H, and H-E, and may identify an alternate least latency path that does not use any of these links.

A fifth set of alternate paths may be identified by dropping an individual link of a path from the first, second, third, or fourth sets of alternate path, along with any other links to or from nodes of the path, excluding the end node, and identifying the best alternative link, or a set of alternative links, to replace the dropped link (block 660). For example, assume the least latency path includes the links A-B-C-D-E, and assume node B is associated with links A-B, B-C, B-K and B-L, node C is associated with links B-C, F-C, and C-D, and node D is associated with links C-D and D-E. A least latency path may be identified that does not include any of these links. The process may be repeated for all the paths in the first, second, third, and fourth sets of alternate paths.

A sixth set of alternate paths may be identified by repeating the process of block 660 on each path of the fifth set of alternate paths (block 670). For example, path latency calculator 340 may repeat the process of dropping an individual link of a path, along with any other links to or from nodes of the path, excluding the end node, and identifying the best alternative link, or a set of alternative links, to replace the dropped link, for each path in the fifth set of alternate paths found by the process of block 650.

Figure 7D:

FIGS. 7A-7H are example tables and user interfaces that may be generated according to an implementation described herein. FIG. 7A illustrates an example of part of a network topology table 710 that may be used to generate network topology table 450. As shown in FIG. 7A, network topology table 710 may include entries of links included in provider network 150. Each entry may specify a start node, an end node, the number of channels included in the link, a type of fiber used in the link, a distance of the link, a DCM type associated with the start node, and a DCM type associated with the end node. Network topology table 710 may be obtained from network topology system 140 by latency analysis system 130 and/or may be generated by latency analysis system 130 based on information obtained from network topology system 140.

FIG. 7B illustrates an exemplary DCM latency table 720 that may correspond to DCM latency table 410. As shown in FIG. 7B, different DCM types may be associated with different latency values. FIG. 7C illustrates an example fiber latency table 730 that may correspond to fiber latency table 420. As shown in FIG. 7C, different fiber types may be associated with different latency values.

FIG. 7D illustrates an exemplary link latency table 740 that may be generated by link latency calculator 320 based on network topology table 710, based on DCM latency table 720, and based on fiber latency table 730, using Equation (1). Link latency table 740 may store information that corresponds to information stored in link latency fields 466 of network topology table 450.

Figure 7E:

FIG. 7E illustrates an exemplary channel utilization table 750. As shown in FIG. 7E, channel utilization table 750 may include information indicating the use of each channel on a link between a first node and a second node. A channel with a zero usage value may indicate an available channel. Channel utilization table 750 may be obtained from channel utilization table 750 by latency analysis system 130 and/or may be generated by latency analysis system 130 based on information obtained from network topology system 140. Channel utilization table 750 may store information that corresponds to information stored in channel capacity fields 464 of network topology table 450.

Figure 7F:
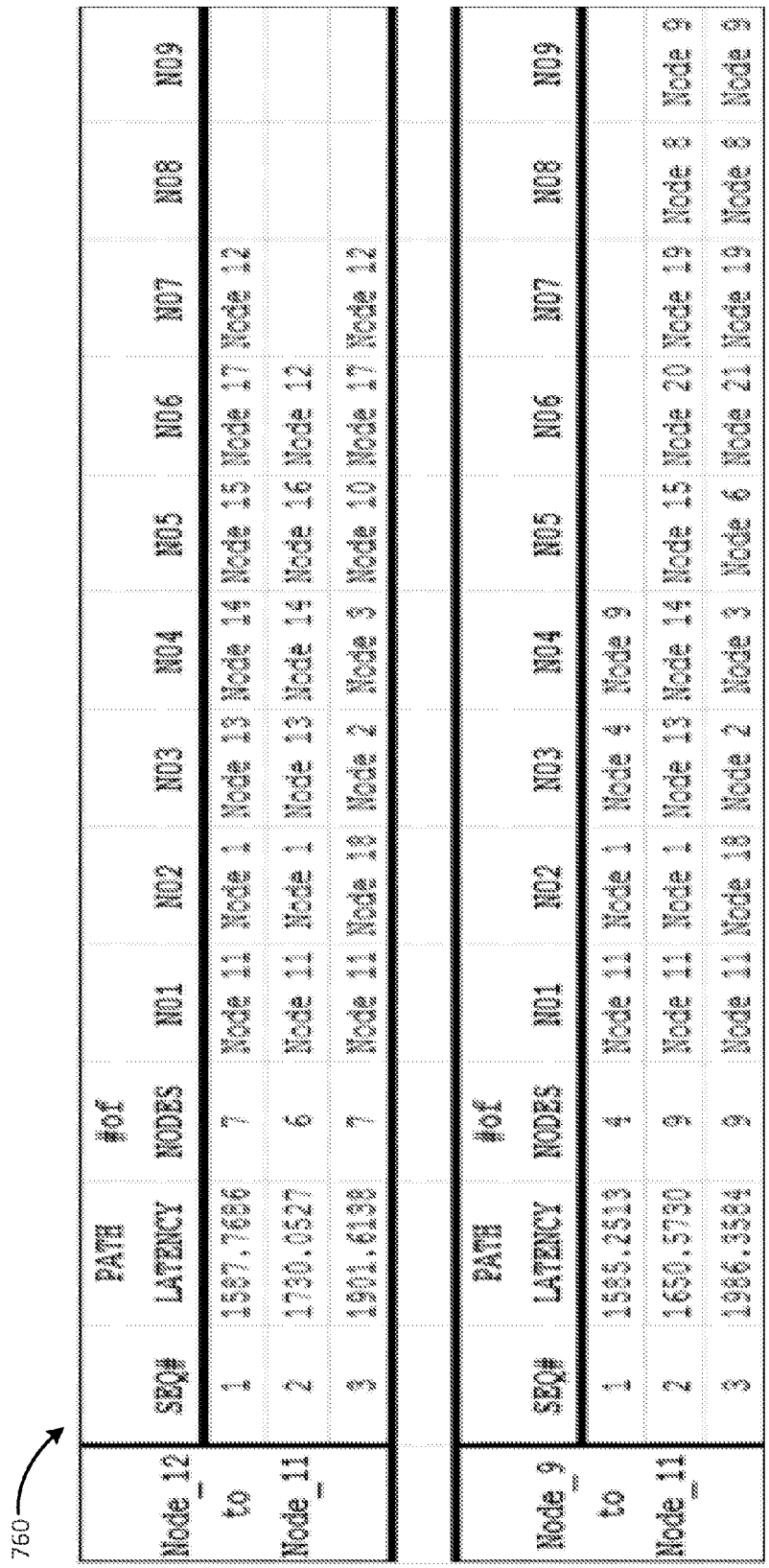

FIG. 7F illustrates an exemplary paths table 760 that displays a least latency path and an alternate path. Paths table 760 may be stored in paths table 365 and provided to user device 110. As shown in FIG. 7F, paths table 760 includes tables for two different paths: a first set of paths from node 12 to node 11 and a second set of paths from node 9 to node 11. The first set of paths includes a least latency path (seq #1) with a latency value of 1588 microseconds, a first alternate path (seq #2) with a latency value of 1730 microseconds, and a second alternate path (seq #3) with a latency value of 1902 microseconds. The least latency path includes a link from node 11 to node 1, a link from node 1 to node 13, a link from node 13 to node 14, a link from node 14 to node 15, a link from node 15 to node 17, and a link from node 17 to node 12. The first alternate path includes a link from node 11 to node 1, a link from node 1 to node 13, a link from node 13 to node 14, a link from node 14 to node 16, and a link from node 16 to node 12. The second alternate path includes a link from node 11 to node 18, a link from node 18 to node 2, a link from node 2 to node 3, a link from node 3 to node 10, a link from node 10 to node 17, and a link from node 17 to node 12.

The second set of paths includes a least latency path (seq #1) with a latency value of 1585 microseconds, a first alternate path (seq #2) with a latency value of 1651 microseconds, and a second alternate path (seq #3) with a latency value of 1986 microseconds. The least latency path includes a link from node 11 to node 1, a link from node 1 to node 4, and a link from node 4 to node 9. The first alternate path includes a link from node 11 to node 1, a link from node 1 to node 13, a link from node 13 to node 14, a link from node 14 to node 15, a link from node 15 to node 20, a link from node 20 to node 19, a link from node 19 to node 8, and a link from node 8 to node 9. The second alternate path includes a link from node 11 to node 18, a link from node 18 to node 2, a link from node 2 to node 3, a link from node 3 to node 6, a link from node 6 to node 21, a link from node 21 to node 19, a link from node 19 to node 8, and a link from node 8 to node 9.

FIG. 7G illustrates an exemplary paths table 770 that displays channel availability for paths that include a contiguous channel. Paths table 770 may be stored in paths table 365 and provided to user device 110. As shown in FIG. 7F, paths table 760 includes tables for two different paths: a first set of paths from node 12 to node 11 and a second set of paths from node 9 to node 11. The first set of paths includes a least latency path (seq #1) with 28 available channels, a first alternate path (seq #2) with 25 available channels, and a second alternate path (seq #3) with 1 available channel. The second set of paths does not include any paths with a contiguous available channels, since the second set of paths includes a least latency path (seq #1) with no available channels, a first alternate path (seq #2) with no available channels, and a second alternate path (seq #3) with no available channels.

Figure 7H:
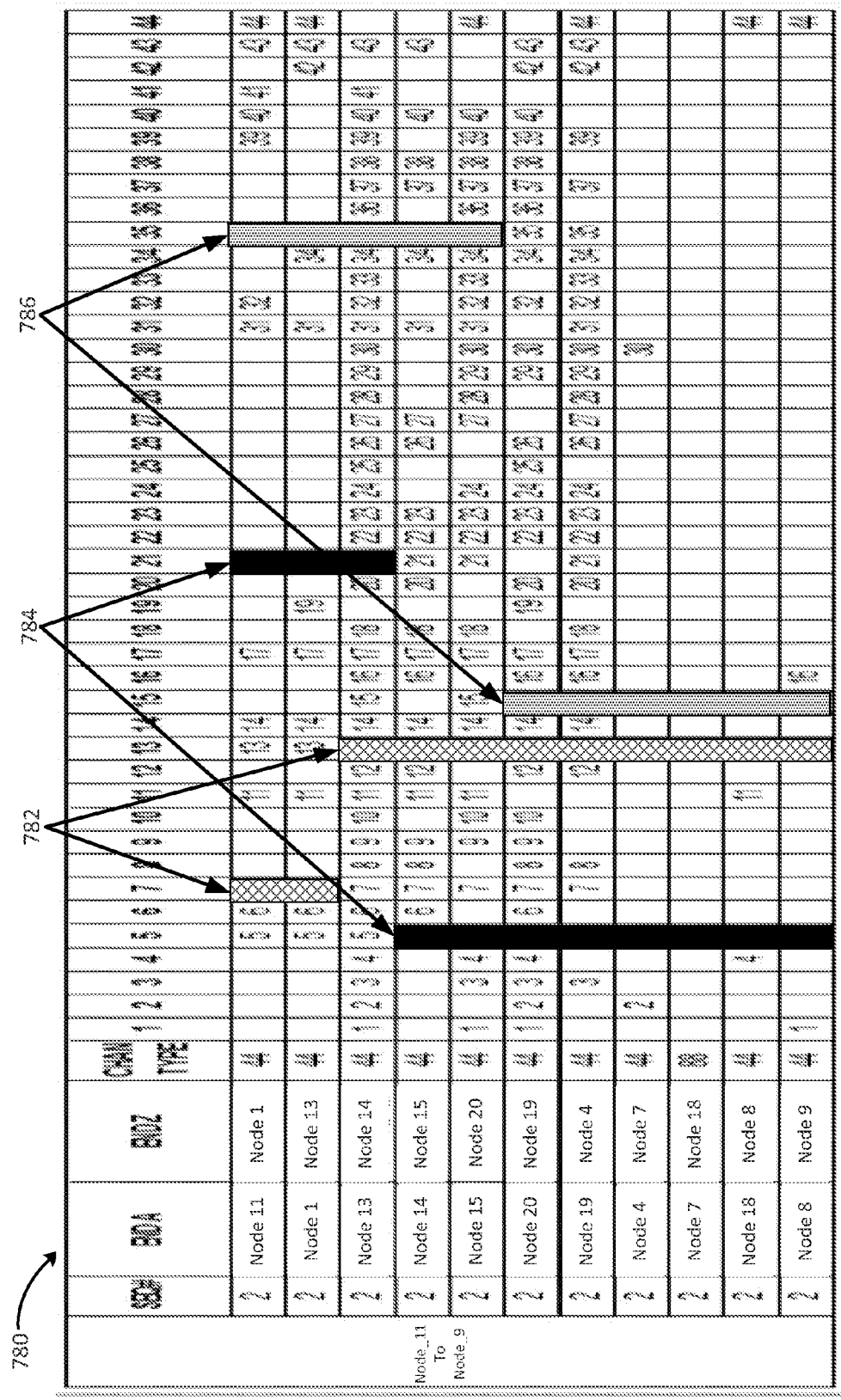

FIG. 7H illustrates an exemplary paths table 780 that displays channel availability for paths that do not include a contiguous channel. Paths table 780 may be stored in paths table 365 and provider to user device 110. As shown in FIG. 7F, paths table 760 includes a path from node 11 to node 9. The path includes a link from node 11 to node 1, a link from node 1 to node 13, a link from node 13 to node 14, a link from node 14 to node 15, a link from node 15 to node 20, a link from node 20 to node 19, a link from node 19 to node 4, a link from node 4 to node 7, a link from node 7 to node 18, a link from node 18 to node 8, and a link from node 8 to node 9. No channel is available for every link of the path and therefore no contiguous channel exists. Therefore, table generator 360 may include indications of the best case scenario, which may include a combination of two channels that can complete the path from node 11 to node 9. In paths table 780, three possibilities exist for a first channel and a second channel that together provide a path from node 11 to node 9. First indication 782 shows that channel 7 is available from node 11 to node 13 and that channel 13 is available from node 13 to node 9. Thus, the signal may need to be switched from channel 7 to channel 13 at node 13. Second indication 784 shows that channel 21 is available from node 11 to node 14 and that channel 5 is available from node 14 to node 9. Thus, the signal may need to be switched from channel 21 to channel 5 at node 14. Third indication 786 shows that channel 35 is available from node 11 to node 20 and that channel 15 is available from node 20 to node 9. Thus, the signal may need to be switched from channel 35 to channel 15 at node 20.

A technician may select one of the three possible channel combinations and may provide information about an available optical circuit to a customer that is looking to buy a circuit from node 11 to node 9, along with an estimation of the path latency associated with the path from node 11 to node 9 shown in paths table 780. Furthermore, the technician may make a recommendation that provider network 150 may need to be augmented to provide additional paths between node 11 and node 9, since no contiguous channels are available.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
  receiving, by the computer device, a selection of a start node and an end node in an optical network;
  obtaining, by the computer device, network topology information relating to optical links between network nodes in the optical network;
  determining, by the computer device, link latencies for particular optical links in the optical network;
  determining, by the computer device, a least latency path of optical signals between the start node and the end node based on the obtained network topology information and the determined link latencies, and wherein the least latency path includes one or more of the particular optical links;
  determining, by the computer device, one or more alternate paths of optical signals to the determined least latency path;
  determining, by the computer device, channel availability for the least latency path and the one or more alternate paths;
  generating, by the computer device, a user interface that relates the least latency path and the one or more alternate paths to the determined channel availability;
  determining, by the computer device, whether a contiguous channel exists with respect to the least latency path or with respect to at least one of the one or more alternate paths based on the determined channel availability; and providing, by the computer device, an indication of the contiguous channel in the generated user interface, when the contiguous channel exists with respect to the least latency path or with respect to the at least one of the one or more alternate paths.

2. The method of claim 1, wherein determining link latencies for particular optical links in the optical network includes:

determining a link latency for an optical link between a first network node and a second network node based on a fiber type associated with the optical link, based on a dispersion compensating module associated with the optical link, and based on a reconfigurable optical add-drop multiplexer associated with the optical link.

3. The method of claim 1, wherein determining link latencies for particular optical links in the optical network includes:

determining a fiber type associated with an optical link between a first network node and a second network node;

determining a fiber latency for the optical link based on the fiber type and based on a length of the optical link;

determining a dispersion compensating module type associated with the optical link;

determining a dispersion compensating module latency for the optical link based on the dispersion compensating module type;

determining a reconfigurable optical add-drop multiplexer type associated with the optical link;

determining a reconfigurable optical add-drop multiplexer latency for the optical link based on the reconfigurable optical add-drop multiplexer type; and determining a link latency for the optical link as a sum of the fiber latency for the optical link, the dispersion compensating module latency for the optical link, and the reconfigurable optical add-drop multiplexer latency for the optical link.

4. The method of claim 1, wherein determining the least latency path of optical signals between the start node and the end node based on the obtained network topology information and the determined link latencies includes:

determining the least latency path by using a Dijkstra algorithm to find a least cost path from the start node to the end node using the determined link latencies and the obtained network topology information.

5. The method of claim 1, wherein determining the least latency path of optical signals between the start node and the end node based on the obtained network topology information and the determined link latencies includes:

determining an interface card latency associated with the least latency path;

determining a reconfigurable optical add-drop multiplexer latency associated with the least latency path; and determining a path latency for the least latency path, wherein the path latency is based on a sum of link latencies associated with links that comprise the least latency path, the interface card latency, and the reconfigurable optical add-drop multiplexer latency.

6. The method of claim 1, wherein determining the one or more alternate paths to the determined least latency path includes:

identifying a first alternate path to the least latency path by dropping an individual optical link from the least latency path and identifying an alternate optical link to replace the dropped individual optical link; or identifying a second alternate path to the least latency path by dropping all optical links from the least latency path and identifying alternate optical links to replace the dropped optical links.

7. The method of claim 6, further comprising:

identifying a third alternate path by dropping an individual optical link from the first alternate path or the second alternate path and identifying an alternate optical link to replace the dropped individual optical link; or identifying a fourth alternate path by dropping all optical links from the first alternate path or the second alternate path and identifying alternate optical links to replace the dropped optical links.

8. The method of claim 7, further comprising:

identifying a fifth alternate path by dropping an individual optical link from the first, second, third, or fourth alternate path, by dropping any other optical links to or from nodes of the first, second, third, or fourth alternate path, and by identifying an alternate optical link to replace the dropped optical link.

9. The method of claim 1, further comprising:

determining that the contiguous channel does not exist with respect to the least latency path and with respect to each of the one or more alternate paths based on the determined channel availability;

identifying a first channel and a second channel with respect to the least latency path or the one or more alternate paths, based on the determined channel availability, wherein switching from the first channel to the second channel, at a node associated with the least latency path or the one or more alternate paths, provides an available path from the start node to the end node, when the contiguous channel does not exist with respect to the least latency path and each of the one or more alternate paths; and providing an indication of the identified first channel and the identified second channel in the generated user interface.

10. A computer device comprising:

a memory to store instructions; and a processor configured to execute the instructions to:

receive a selection of a start node and an end node in an optical network;

obtain network topology information relating to optical links between network nodes in the optical network;

determine link latencies for particular optical links in the optical network;

determine a least latency path of optical signals between the start node and the end node based on the obtained network topology information and the determined link latencies, and wherein the least latency path includes one or more of the particular optical links;

determine one or more alternate paths of optical signals to the determined least latency path;

determine channel availability for the least latency path and the one or more alternate paths;

generate a user interface that relates the least latency path and the one or more alternate paths to the determined channel availability;

determine whether a contiguous channel exists with respect to the least latency path or with respect to at least one of the one or more alternate paths based on the determined channel availability; and provide an indication of the contiguous channel in the generated user interface, when the contiguous channel exists with respect to the least latency path or with respect to the at least one of the one or more alternate paths.

11. The computer device of claim 10, wherein the processor is further configured to:
   determine a link latency for an optical link between a first network node and a second network node based on a fiber type associated with the optical link, based on a dispersion compensating module associated with the optical link, and based on a reconfigurable optical add-drop multiplexer associated with the optical link.

12. The computer device of claim 10, wherein when the processor is configured to determine link latencies for particular optical links in the optical network, the processor is further configured to:
   determine a fiber type associated with an optical link between a first network node and a second network node;
   determine a fiber latency for the optical link based on the fiber type and based on a length of the optical link;
   determine a dispersion compensating module type associated with the optical link;
   determine a dispersion compensating module latency for the optical link based on the dispersion compensating module type;
   determine a reconfigurable optical add-drop multiplexer type associated with the optical link;
   determine a reconfigurable optical add-drop multiplexer latency for the optical link based on the reconfigurable optical add-drop multiplexer type; and
   determine a link latency for the link as a sum of the fiber latency for the optical link, the dispersion compensating module latency for the optical link, and the reconfigurable optical add-drop multiplexer latency for the optical link.

13. The computer device of claim 10, wherein when the processor is configured to determine the least latency path of optical signals between the start node and the end node based on the obtained network topology information and the determined link latencies, the processor is further configured to:
   determine the least latency path by using a Dijkstra algorithm to find a least cost path from the start node to the end node using the determined link latencies and the obtained network topology information.

14. The computer device of claim 10, wherein, when the processor is configured to determine the least latency path of optical signals between the start node and the end node based on the obtained network topology information and the determined link latencies, the processor is further configured to:
   determine an interface card latency associated with the least latency path;
   determine a reconfigurable optical add-drop multiplexer latency associated with the least latency path; and
   determine a path latency for the least latency path, wherein the path latency is based on a sum of link latencies associated with links that comprise the least latency path, the interface card latency, and the reconfigurable optical add-drop multiplexer latency.

15. The computer device of claim 10, wherein, when the processor is configured to determine the one or more alternate paths to the determined least latency path, the processor is further configured to:
   identify a first alternate path to the least latency path by dropping an individual optical link from the least latency path and identifying an alternate optical link, or a plurality of alternate links, to replace the dropped individual optical link;
   identify a second alternate path to the least latency path by dropping all optical links from the least latency path and identifying alternate optical links to replace the dropped optical links;
   identify a third alternate path by dropping an individual optical link from the first alternate path or the second alternate path and identifying an alternate optical link, or a plurality of alternate links, to replace the dropped individual optical link;
   identify a fourth alternate path by dropping all optical links from the first alternate path or the second alternate path and identifying alternate optical links to replace the dropped optical links; or
   identify a fifth alternate path by dropping an individual optical link from the first, second, third, or fourth alternate path, by dropping any other optical links to or from nodes of the first, second, third, or fourth alternate path, and by identifying an alternate optical link, or a plurality of alternate links, to replace the dropped optical link.

16. The computer device of claim 10, wherein the processor is further configured to:
   determine that a contiguous channel does not exist with respect to the least latency path and with respect to each of the one or more alternate paths based on the determined channel availability;
   identify a first channel and a second channel with respect to at least one of the least latency path or the one or more alternate paths, based on the determined channel availability, wherein switching from the first channel to the second channel, at a node associated with the at least one of the least latency path or the one or more alternate paths, provides an available path from the start node to the end node, when the contiguous channel does not exist with respect to the least latency path and each of the one or more alternate paths; and
   provide an indication of the identified first channel and the identified second channel in the generated user interface.

17. A non-transitory computer-readable medium, storing instructions executable by a processor, the non-transitory computer-readable medium comprising:
   one or more instructions to receive a selection of a start node and an end node in an optical network;
   one or more instructions to obtain network topology information relating to optical links between network nodes in the optical network;
   one or more instructions to determine link latencies for particular optical links in the optical network based on a fiber type associated with the particular links, based on a dispersion compensating module associated with the particular links, and based on a reconfigurable optical add-drop multiplexer associated with the particular links;
   one or more instructions to determine a least latency path of optical signals between the start node and the end node based on the obtained network topology information and the determined link latencies, and wherein the least latency path includes one or more of the particular optical links;
   one or more instructions to determine one or more alternate paths of optical signals to the determined least latency path;
   one or more instructions to determine channel availability for the least latency path and the one or more alternate paths;
   one or more instructions to determine whether a contiguous channel exists with respect to the least latency path or with respect to at least one of the one or more alternate paths based on the determined channel availability;
one or more instructions to generate a user interface that relates the least latency path and the one or more alternate paths to the determined channel availability; and
one or more instructions to provide an indication of the contiguous channel in the generated user interface, when the contiguous channel exists with respect to the least latency path or with respect to the at least one of the one or more alternate paths.

18. The non-transitory computer-readable medium of claim 17, wherein the one or more instructions to determine the one or more alternate paths to the determined least latency path include:
one or more instructions to identify a first alternate path to the least latency path by dropping an individual optical link from the least latency path and identifying an alternate optical link, or a plurality of alternate optical links, to replace the dropped individual optical link;
one or more instructions to identify a second alternate path to the least latency path by dropping all optical links from the least latency path and identifying alternate optical links to replace the dropped optical links;
one or more instructions to identify a third alternate path by dropping an individual optical link from the first alternate path or the second alternate path and identifying an alternate optical link, or a plurality of alternate optical links, to replace the dropped individual optical link;
one or more instructions to identify a fourth alternate path by dropping all optical links from the first alternate path or the second alternate path and identifying alternate optical links to replace the dropped optical links; or
one or more instructions to identify a fifth alternate path by dropping an individual optical link from the first, second, third, or fourth alternate path, by dropping any other optical links to or from nodes of the first, second, third, or fourth alternate path, and by identifying an alternate optical link, or a plurality of alternate optical links, to replace the dropped optical link.

19. The non-transitory computer-readable medium of claim 17, further comprising:
one or more instructions to identify a first channel and a second channel with respect to at least one of the least latency path or the one or more alternate paths, based on the determined channel availability, wherein switching from the first channel to the second channel, at a node associated with the at least one of the least latency path or the one or more alternate paths, provides an available path from the start node to the end node, when the contiguous channel does not exist with respect to the least latency path and each of the one or more alternate paths; and
one or more instructions to provide an indication of the identified first channel and the identified second channel in the generated user interface.

20. The non-transitory computer-readable medium of claim 17, wherein the one or more instructions to determine the least latency path of optical signals between the start node and the end node based on the obtained network topology information and the determined link latencies further include:
one or more instructions to determine an interface card latency associated with the least latency path;
one or more instructions to determine a reconfigurable optical add-drop multiplexer latency associated with the least latency path; and
one or more instructions to determine a path latency for the least latency path, wherein the path latency is based on a sum of link latencies associated with links that comprise the least latency path, the interface card latency, and the reconfigurable optical add-drop multiplexer latency.

* * * * *